United States Patent
Babington (10) Patent No.: US 7,100,599 B2
(45) Date of Patent: Sep. 5, 2006

(54) TRAY RATION HEATING SYSTEM

(76) Inventor: Robert S. Babington, 1113 Ingleside Ave., McLean, VA (US) 22101

( * ) Notice: Subject to any disclaimer, the term of this patent is extended or adjusted under 35 U.S.C. 154(b) by 12 days.

(21) Appl. No.: 10/897,033

(22) Filed: Jul. 23, 2004

(65) Prior Publication Data

US 2005/0056270 A1 Mar. 17, 2005

Related U.S. Application Data

(60) Provisional application No. 60/493,795, filed on Aug. 11, 2003.

(51) Int. Cl.
*A47J 27/26* (2006.01)

(52) U.S. Cl. ............... 126/376.1; 126/390.1; 99/403; 165/159

(58) Field of Classification Search ............ 126/376.1, 126/373.1, 377.1, 390.1, 391.1, 33; 99/403; 165/157, 159, 161, 168, 185
See application file for complete search history.

(56) References Cited

U.S. PATENT DOCUMENTS

| | | | | |
|---|---|---|---|---|
| 2,525,213 | A | * | 10/1950 | Doolin ..................... 126/33 |
| 4,397,299 | A | * | 8/1983 | Taylor et al. ............ 126/376.1 |
| 4,913,041 | A | * | 4/1990 | Taber et al. ................. 99/403 |
| 5,632,197 | A | * | 5/1997 | Lubawy et al. .......... 126/391.1 |
| 5,975,071 | A | | 11/1999 | Babington |
| 6,374,821 | B1 | * | 4/2002 | Furuhashi ................ 126/376.1 |
| 6,453,487 | B1 | | 9/2002 | Babington |

FOREIGN PATENT DOCUMENTS

EP 0 125 750 A2 * 11/1984

OTHER PUBLICATIONS

Natick web page, "Heater prepares multiple rations", pp. 1-2.
Natick web page, Multi-Ration Heater (MRH), pp. 1-2.
"Tray Ration Heater System", U.S. Army Soldier Systems Center-Natick, MA, 5 pages.
"Evaluation of the Multi-Ration Heater", U.S. Army Soldier and Biological Chemical Command Natick Soldier Center, 5 pages.
Statement of Work (SOW) for the Multi-Ration Heater Units and Additional Component Parts Task 11, Contract DAAD05-01-D-0008, 2 pages.
Marine Tray Ration Heater, 21 pages.

* cited by examiner

*Primary Examiner*—Josiah C. Cocks
(74) *Attorney, Agent, or Firm*—Connolly Bove Lodge & Hutz LLP (57) ABSTRACT

An improved tray ration heating system includes a reservoir. A heat exchanger transfers heat to the reservoir. A firebox at one end of the reservoir has an opening to receive a burner flame tube. The firebox delivers heated gasses from the burner flame tube along the underside of the reservoir to an opposite end of the reservoir. A main channel along the reservoir includes baffles which produce a tortuous path and introduce turbulence to the hot gasses. First and second channels adjacent to the main channel redirect hot air exiting the main channel, and third and fourth channels direct hot gasses exiting the first and second channels towards the opposite end of the reservoir. An exhaust channel extends along a vertical wall of the reservoir to an exhaust opening. The exhaust channel has baffles for displacing hot gasses across the vertical wall. An insulated outer liner supports the reservoir and heat exchanger.

9 Claims, 8 Drawing Sheets

Thermocouple Placement Map (avg. temp)

ary Ration Heating System

CROSS-REFERENCE TO RELATED APPLICATIONS

This application is a U.S. Utility patent application claiming priority to provisional application No. 60/493,795, filed Aug. 11, 2003.

BACKGROUND OF THE INVENTION

This disclosure relates to a system for heating water or other liquids, and more particularly relates to a portable system for heating relatively large volumes of liquid, and even more particularly relates to a portable system for cooking food which offers improved heat transfer to the liquid volume and improved safety for the operators of the system.

Field feeding large numbers of people, such as troops on the move during military maneuvers, or in an emergency disaster, requires that portable equipment be used to prepare food on a large scale. The military has developed over the years food rations which are maintained in a stored tray and need only be heated before there are served. However, when feeding thousands of personnel, the equipment must be available to heat the tray rations on a large scale.

Once such system for heating tray rations is disclosed in U.S. Pat. No. 5,975,071. The disclosed tray ration heating system includes a hundred gallon tub heated by a liquid fuel burner. The device is supported on a pair of skids, and requires only two personnel to load it in a vehicle where it may be rapidly transported to the area of food preparation. Once the tub is filled with water, and tray ration containers loaded within the tub, the lid is closed. Heat is supplied along the sides and underside of the tub raising the temperature of the water bath containing the tray rations containers to a temperature approaching 212° F. Once the bath has reached temperature, a temperature sensor turns the burner off, and cycling of the burning occurs to maintain the selected temperature.

The foregoing system of the prior art utilizes a type of heat exchange system which while effective, involves certain manufacturing costs and assembly procedures which are not conducive to mass production. Accordingly, the foregoing heat exchange system has been redesigned in accordance with the present invention.

BRIEF SUMMARY OF THE INVENTION

An improved tray ration heating system includes a reservoir for heating tray rations in a bath of water. A firebox under the bottom of the reservoir is opened at the top facing the reservoir. The heat exchanger extends from the firebox along the bottom of the reservoir and along one vertical side of the reservoir. The heat exchanger forms a plurality of channels with the bottom of the reservoir for directing heat in first and second opposite direction. A passageway is formed along the vertical side for directing heat from the plurality of channels to an exhaust opening. An outer liner encloses the reservoir heat exchanger and firebox and supports a lid for closing the reservoir during heating of tray rations. A burner and controller supply heat to the firebox which is transferred through the channels and passageway, heating the bottom and vertical side of the reservoir to a temperature for heating the bath of water containing tray rations.

In one embodiment, a tray ration heating system includes a reservoir open at its top to receive tray rations and immerse tray rations in hot water. A heat exchanger transfers heat to the reservoir. In one aspect of this embodiment, the heat exchanger includes a firebox at one end of the reservoir. The firebox has an opening at one end to receive a burner flame tube and is open along a top which faces an underside of the reservoir. The firebox has a tapered opening at an opposite end to deliver products of combustion of hot gasses, hereinafter referred to as hot gasses or exhaust gasses from the burner along the underside of the reservoir to an opposite end of the reservoir.

A main channel of the heat exchanger communicates with the opening and extends the length of the reservoir underside. The channel includes a first plurality of baffles for introducing turbulence to hot gasses moving through the channel towards the opposite end of the reservoir as well as increase the effective path length of the heat exchanger. First and second auxiliary channels adjacent to the main channel are arranged to direct hot gasses exiting the main channel along the underside of the reservoir back towards the firebox.

Third and fourth auxiliary channels adjacent to the first and second auxiliary channels direct hot gasses exiting the first and second channels towards the opposite end of the reservoir. An exhaust channel communicates with the third and fourth auxiliary channels and extends along a vertical wall of the reservoir for directing the hot gasses along the vertical wall to an exhaust opening. The exhaust channel has a second plurality of baffles for laterally displacing the hot gasses across the vertical wall thereby increasing the effective length of the heat exchanger.

An insulated outer liner supports the reservoir and heat exchanger. The insulated outer liner has a lid which closes the reservoir top during heating. The outer liner also supports the burner which has a flame tube which extends into the firebox. A pair of skids is connected to the outer liner to provide support for the tray ration heating system on the ground or other suitable surface.

In another aspect of this embodiment, a heat exchanger system suitable for use in transferring heat to a reservoir of liquid includes a burner with a flame tube inserted into a firebox having an opening at one end which receives the flame tube, and a tapered (angled) opening at an opposite end through which exhaust gasses produced by the burner flows. A main channel communicates with the tapered opening and extends in a first direction from an end of the reservoir along a surface of the reservoir to an opposite end of the reservoir. The main channel guides the heated combustion gasses along the first direction.

First baffle means arranged in the main channel provides directed flow of exhaust gasses in a turbulence flow as the heated air travels through the main channel towards the opposite end of the reservoir in the first direction. First and second auxiliary channels lie adjacent to the main channel and are joined together at an open end portion of the main channel. The first and second auxiliary channels are separated by the main channel and arranged to direct the heated gasses in a second direction along the surface of the reservoir opposite to the first direction. The first and second auxiliary channels direct the heated gasses exiting the main channel from the opposite end of the reservoir back towards the firebox.

Third and fourth auxiliary channels, each adjacent to one of the first and second auxiliary channels and separated from each other by the main channel and the first and second channels, are arranged to direct the heated gasses exiting the first and second channels towards the opposite end of the reservoir along the surface of the reservoir in the first direction. A vertical exhaust channel communicates with the third and fourth auxiliary channels and extends along a vertical wall of the reservoir.

The vertical exhaust channel is arranged to direct the heated air along the vertical wall to an exhaust opening. Second baffle means are arranged in the vertical exhaust channel to laterally displace the heated gasses across an end portion width of the reservoir before the heated gasses reaches the exhaust opening.

An insulated outer cover contains or envelopes the reservoir and heat exchanger. The insulated outer liner has a lid which closes to cover the reservoir top during heating. The insulated outer cover both supports the burner and insulates the burner from an external environment.

In another embodiment, a method for transferring heat to a reservoir of liquid through a heat exchanger includes introducing heated gasses into a firebox; flowing the heated gasses from the firebox along a surface of the reservoir in a first direction; reversing the direction of the heated gas flow along the surface of the reservoir in a second direction; again reversing the heated gas flow along the surface of the reservoir to direct the heated gas flow in the first direction; directing the heated gas flow along a vertical surface of the reservoir; laterally displacing the heated gas flow along the vertical surface of the reservoir; and exhausting the heated gas flow from the heat exchanger.

DETAILED DESCRIPTION OF THE INVENTION

Figure 1:
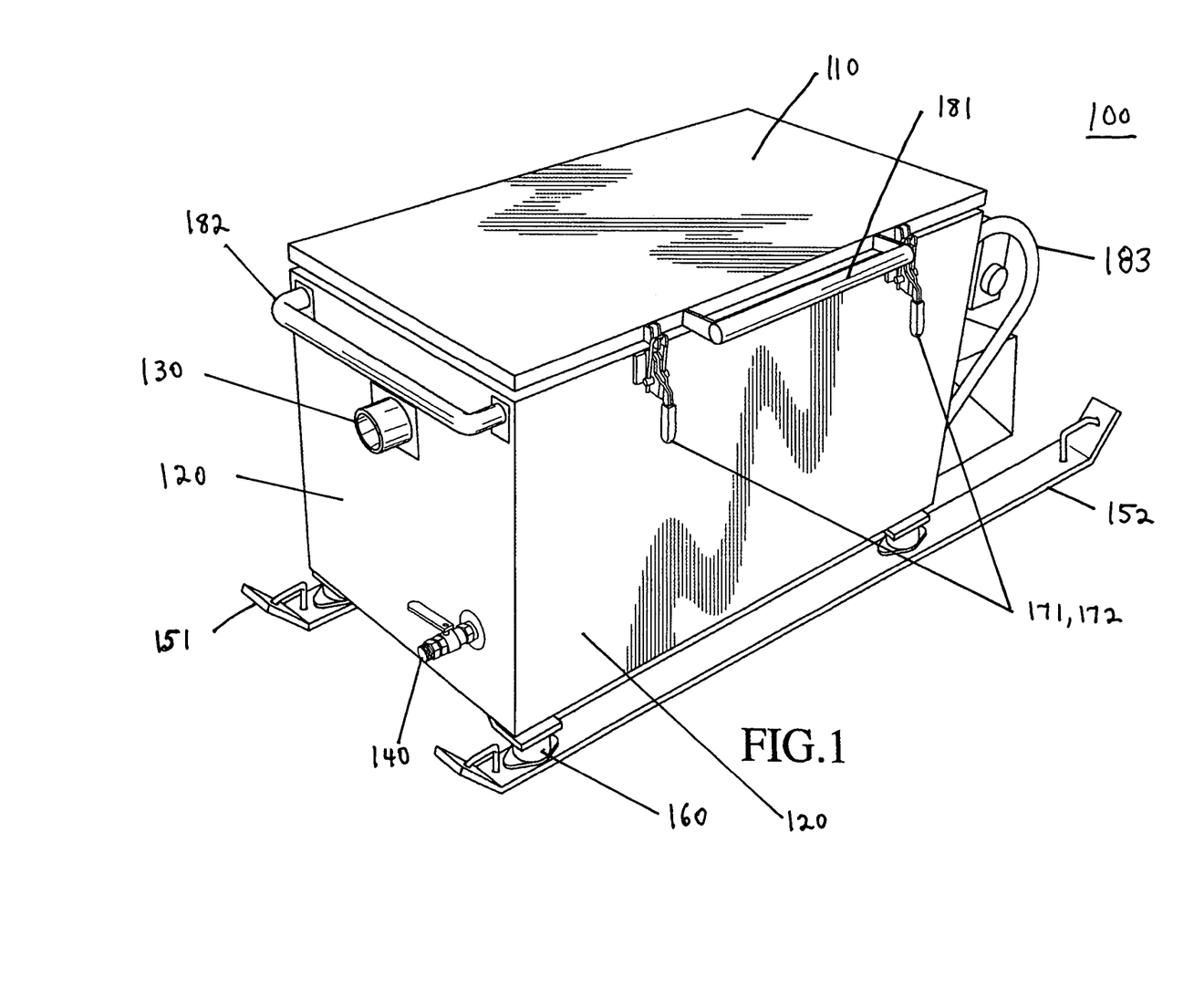
FIG. 1 is a perspective view of an improved tray ration heating system according to an exemplary embodiment of the invention.

As shown in FIG. 1, an exterior, closed view of an embodiment of tray ration heating system 100 includes top 110 connected to insulated outer liner 120 by one or more hinges (not shown). Top 110 may include a suitable gasket material (not shown) for effective sealing to prevent liquid leakage. Exhaust pipe 130 and water drain valve 140 protrude through insulated outer liner 120. Support skids 151 and 152 are attached to insulated outer liner 120 by resilient mounts 160. Latches 171 and 172 releasably hold top 110 in a closed position with respect to insulated outer liner 120. Handle 181 is connected to top 110 for ease of opening and closing. Handle 182 is attached to the exhaust end of insulated outer liner 120. Handles 183 and 184 are attached to the burner end of insulated outer liner 120. Tray ration heating system 100 is portable, and rugged, and may be used in a variety of relatively harsh operating environments in the field, including heat on the move applications.

Figure 2:
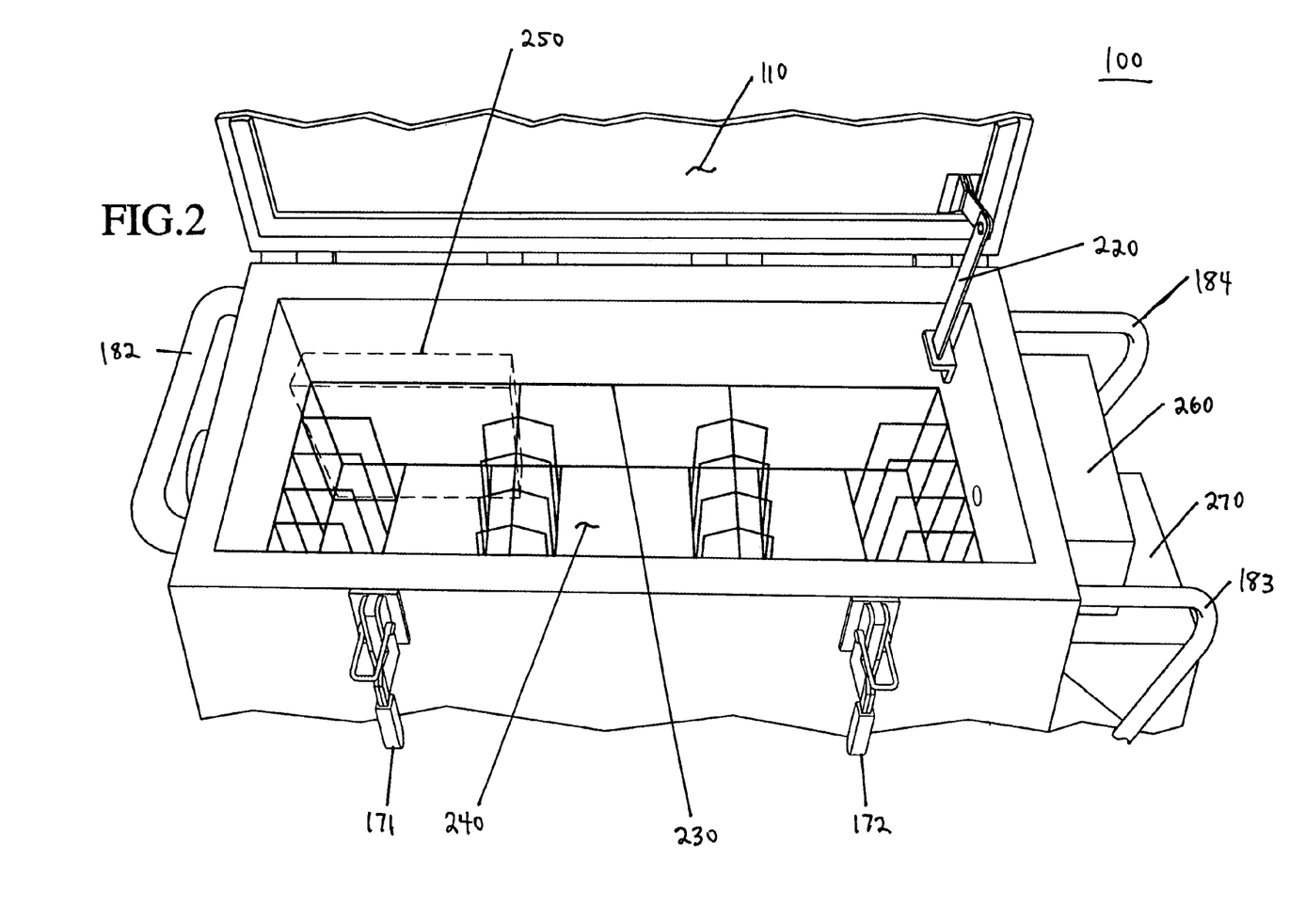
FIG. 2 is a perspective view of the improved tray ration heating system of FIG. 1 with its top open, showing a portion of the inside of the system, including racks for receiving tray rations.

In FIG. 2, tray ration heating system 100 is shown with top 110 held open with locking support arm 220. Rack assembly 230 is arranged within reservoir or inner tub 240 to receive tray rations or tray packs 250 (shown in dashed lines), and immerse them in hot water, for example, contained by reservoir 240. Reservoir 240 may generally be any size necessary to meet the particular operational requirements, but may be sized, for example, to have a 30-gallon capacity. Controller 260 and burner assembly 270 are arranged at the burner end of tray ration heating system 100. Controller 260 may be powered by standard 120 VAC, or other suitably converted AC or DC supply voltage. Controller 260 may include an "on/off" switch (not shown), and other control actuators and safety elements. Burner assembly 270 may be a Babington Enterprises Airtronic® Burner. Top 110 and reservoir 240 may constructed from stainless steel, for example, e.g., SS 304, or other corrosion resistant metal, and possibly could be made from other corrosion and heat resistant materials, such as composite materials, as necessary or desired to meet particular operational or functional requirements.

Figure 3:
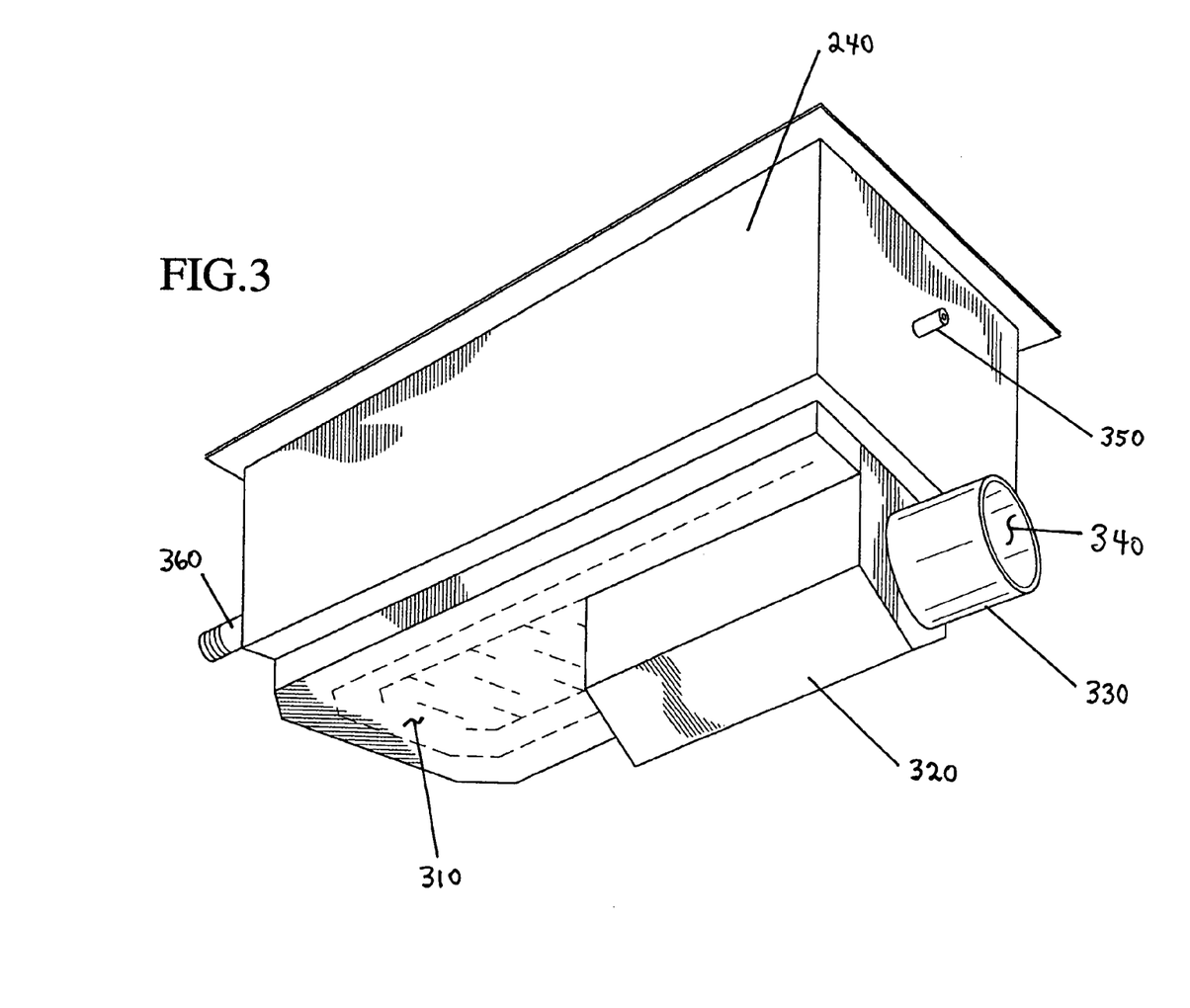
FIG. 3 is a perspective view of an embodiment of the invention illustrating the exterior of the firebox and heat exchanger attached to the underside of a reservoir.
Figure 4:
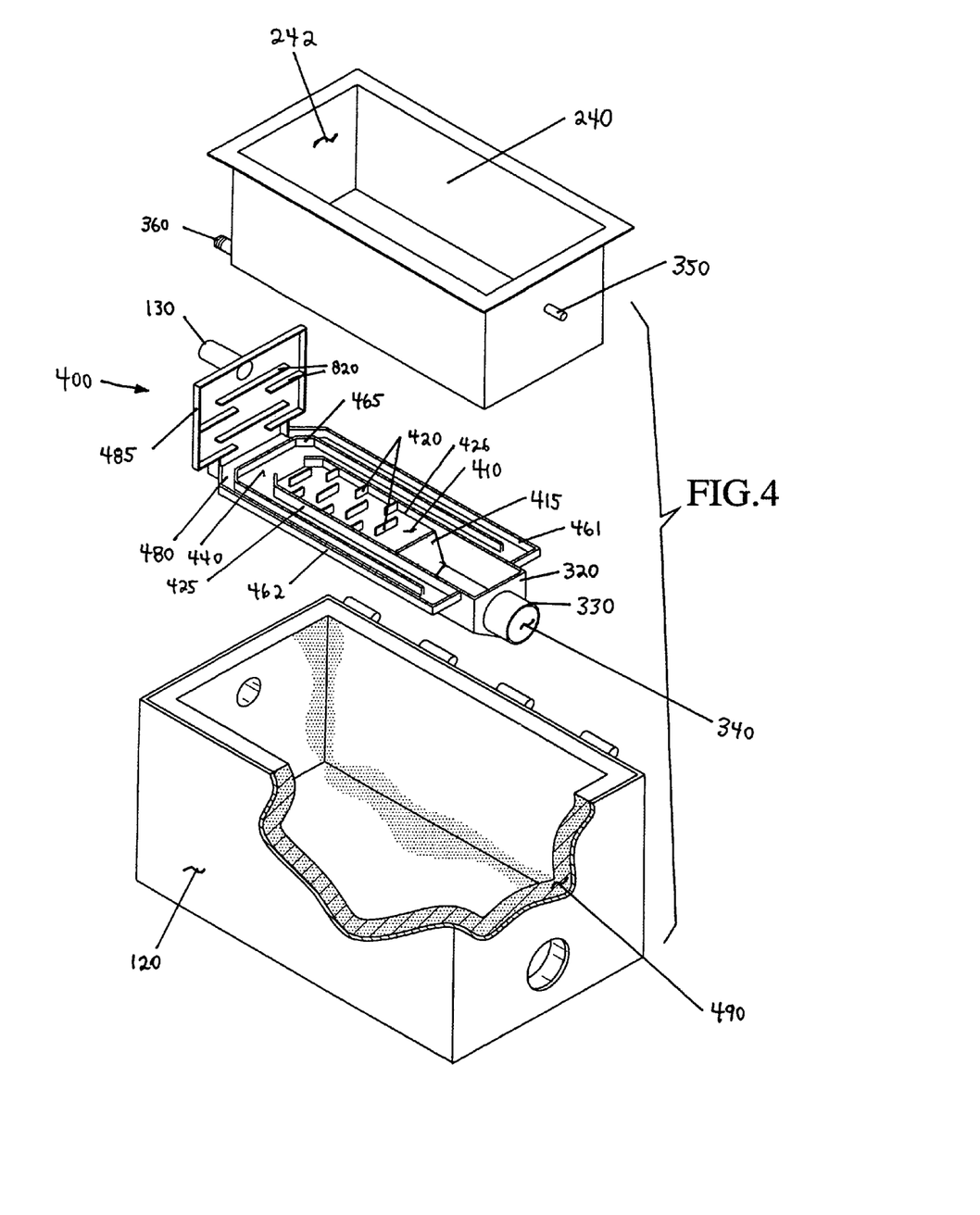
FIG. 4 provides an exploded perspective view illustrating the relative arrangement of the reservoir, firebox and heat exchanger, and insulated outer cover of the embodiment of FIG. 1.

FIG. 3 shows an underside of reservoir 240, with insulated outer liner 120 removed for clarity. In FIGS. 3 and 4 outer shell 310 of heat exchanger 400 may be arranged on a bottom of reservoir 240 and along a back vertical wall to transfer heat to reservoir 240 and its contents, e.g., water. At the burner end of reservoir 240, firebox 320 is arranged. Firebox 320 includes conical flame tube 330 having opening 340 which facilitates insertion of a burner flame tube (not shown) of burner assembly 270. Outer shell 310 may be notched at one end to fit around at least a portion of firebox 320, and also covers the internal components and structure of heat exchanger 400, as discussed below. Low-water level sensor 350 may be arranged on a side or end of reservoir 240 and may be operatively coupled to controller 260 for safety shut off, in the event that the liquid level in reservoir 240 becomes too low during operation. Water drain valve 360 is arranged at a relatively low position on a side or end of reservoir 240 to facilitate draining reservoir 240. Reservoir 240 may also have a temperature sensor (not shown) coupled to controller 260 to control the burner on-off sequence to establish a desired temperature of the liquid in reservoir 240, and to prevent an unsafe temperature situation from arising.

Figures 7, 8:
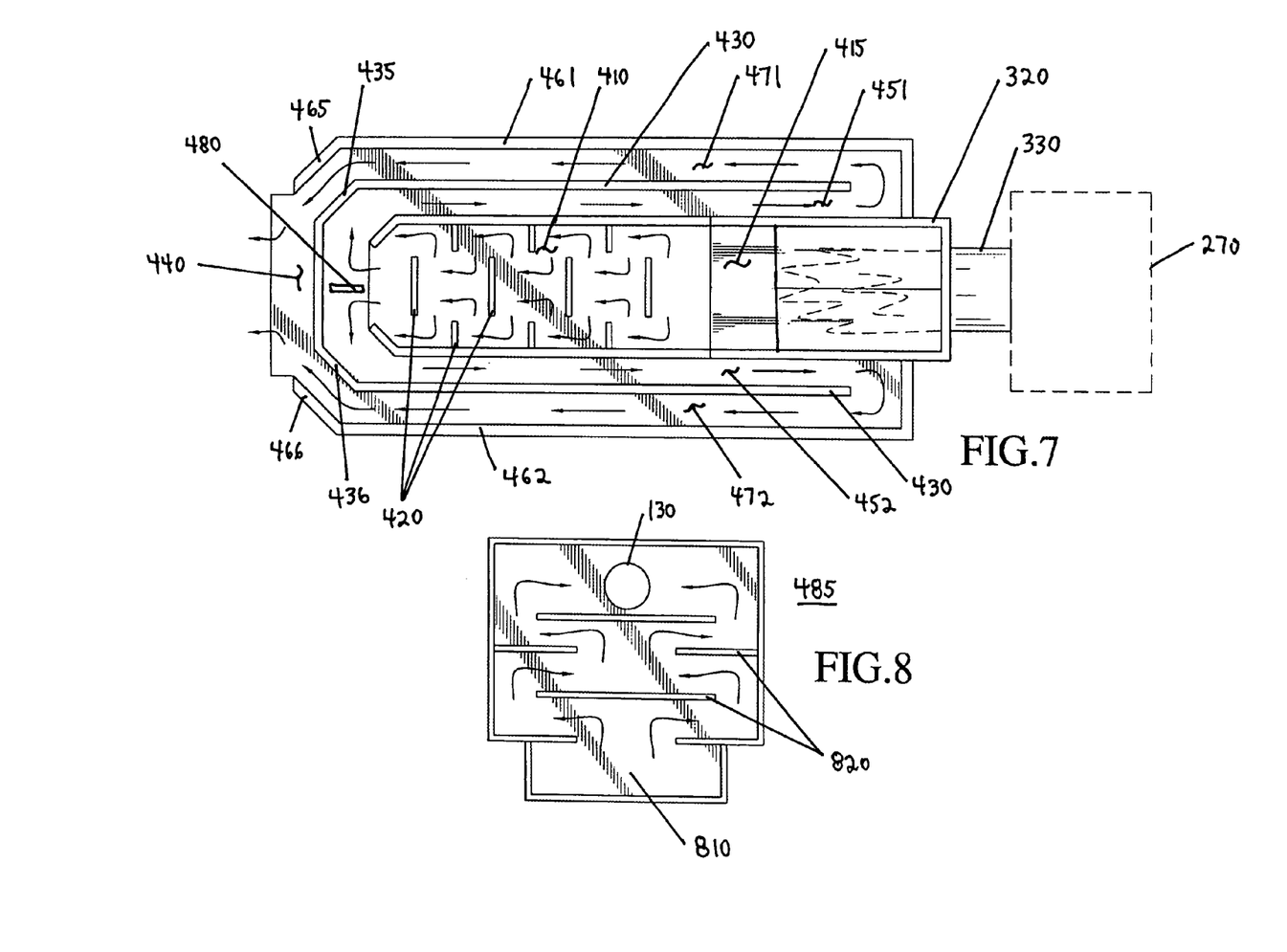
FIG. 7 provides a plan view of a main portion of the heat exchanger and firebox of an embodiment of the invention illustrating the flow of heated air from the firebox through the heat exchanger.
FIG. 8 provides an elevation view of the vertical portion of the heat exchanger and exhaust port of an embodiment of the invention, which also illustrates the flow of heated air from the main portion of the heat exchanger of FIG. 7, through the vertical portion of the heat exchanger, to the exhaust port.

FIG. 4 depicts, in an expanded view, the relative arrangement of the component parts during assembly of system 100. In particular, exemplary aspects of heat exchanger 400 are able to be viewed, as well as further details of insulated outer liner 120. FIG. 7 provides a plan view of heat exchanger 400, with flow paths of various channels formed with the bottom of reservoir 240.

In this embodiment, heat exchanger 400 includes primary channel assembly 410 which is attached to firebox 320. Primary channel assembly 410 may be Hastalloy X® high temperature alloy, or other high temperature, corrosion resistant material. Tapered portion or angled opening 415 is internal to firebox 320, and provides a relatively smooth transition piece which acts to more efficiently deliver hot gases from the burner flame tube inserted into firebox 320 in heat exchanger 400, and reduce the amount of heat reflection back to the burner. The hot gases flow from firebox 320 through channel assembly 410 along the underside of reservoir 240 to an opposite end of reservoir 240. An outer shell of firebox 320 may be made from stainless steel, e.g., SS 304, and an interior portion of firebox 320, including tapered or angled portion 415, may be lined with commercially available hardboard insulation, e.g., alumina silica, or other insulation material suitable for withstanding temperatures in firebox 320 of between 2400 F.–2500 F.

Main channel baffles 420 are arranged along a surface of primary channel assembly 410. A portion of main channel baffles 420 are in a central region of a lateral surface of primary channel assembly 410, and some are arranged at a peripheral region of primary channel assembly 410, abutting with perimeter walls 425 and 426, for example. Main channel baffles 420 act to create turbulence in the flow of hot air provided from firebox 320, and to encourage more lateral flow of hot air along primary channel assembly 410 from the burner end of reservoir 240 to the other end of reservoir 240. Such lateral, serpentine flow of hot gasses along the surface of primary channel assembly 410 increases the effective dwell time of the hot gasses in contact with the underside of reservoir 240, to which primary channel assembly 410 and heat exchanger 400 are ultimately attached. More efficient heat transfer into reservoir 240 results from the increased dwell time along the primary channel of heat exchanger 400. Main channel baffles 420 may also be made from Hastalloy X®, and may have an "L"-shaped cross-section (not shown) formed from bending plate material to about a 90° angle. The shorter length portion of the "L"-shape may be spot or tack welded, for example, or otherwise suitably attached to the lateral surface portion of primary channel assembly 410 to provide the necessary structural support.

Primary channel assembly 410 has perimeter walls 425 and 426 arranged essentially parallel to each other except for an angled portion at an open end portion of primary channel assembly 410. Perimeter walls 425 and 426 are connected to and extend from firebox 320, as shown in FIGS. 4 and 7. Perimeter walls 425 may be integrally attached to the lateral surface portion of primary channel assembly 410 by welding, for example, or may be unitary with the lateral surface portion of primary channel assembly 410, i.e., constructed by bending plate material to roughly a 90° angle to form the walls. Optional exhaust gas flow splitter 480 may be arranged at the open end portion of primary channel assembly 410.

For ease of manufacturing and assembly, primary channel assembly 410 including perimeter walls 425, main channel baffles 420, firebox 320, and conical flame tube 330 may be pre-assembled as a unit. This pre-assembled unit may then be attached to the underside of reservoir 240 by tack welding perimeter walls 425 and 426 to the underside of reservoir 240, for example.

Surface 440 may be plate material, e.g., stainless steel plate, which has a larger surface area than primary pass assembly 410 that extends beyond the length and width of primary channel assembly 410. Surface portion 440, after primary channel assembly 410 is attached to the underside of reservoir 240, may then be attached to the bottom of primary channel assembly 410 by welding, e.g., spot or plug welding. Surface 440 may be of a different type of material than primary channel assembly 410, e.g., stainless steel, because of the somewhat less stressful temperature environment experienced by surface 440, relative to primary channel assembly 410. Surface 440 provides a surface upon which plural auxiliary channels may be formed for directing and redirecting the flow of hot gasses through heat exchanger 400.

Inner channel divider 430 as shown in FIG. 7 is generally a flattened "U"-shape, and may have angled portions 435 and 436 to better help direct and reverse the flow of hot gasses through the various portions of heat exchanger 400, e.g., from the outlet of primary channel assembly 410 back toward firebox 320 along inner auxiliary channels 451 and 452 to provide a "second pass" of the hot gases along the underside of reservoir 240. Inner channel divider 430 may also have an "U-shaped cross-section, to aid in attachment to the upper surface of surface 440 by tack welding, for example. Inner channel divider 430 acts to separate inner auxiliary channels 451 and 452 from inner primary channel assembly 410, and to separate outer auxiliary channels 471 and 472 from inner auxiliary channels 451 and 452, respectively. Inner channel divider 430 also acts to prevent leakage of hot gases between inner and outer auxiliary channels 471 and 472, and also provides, by using the shorter portion of the "L"-shape, a support and attachment area for eventual attachment of outer shell 310 of heat exchanger 400, by plug welding, for example.

Outer channel dividers 461 and 462 attach to firebox 320 as shown in FIG. 7, and are arranged on a peripheral region of surface portion 440 as an part of an outer shell of heat exchanger 400. Outer channel dividers 461 and 462 extend essentially parallel to each other, except at the firebox attachment region and at angled open portions 465 and 466 at an end opposite the firebox region. Outer channel dividers 461 and 462 establish an outer perimeter around inner channel divider 430 and primary channel assembly 410. Outer auxiliary channels 471 and 472 are arranged to direct the second pass hot gasses exiting inner auxiliary channels 451 and 452 near firebox 320 away from firebox 320 in a "third pass" of the hot gases along the underside of reservoir 240. Each pass of the hot gases along the underside of reservoir 240 allows more heat energy to be transferred into the contents of reservoir 240, and helps, ultimately, to increase the efficiency of energy transfer, and reduced exhaust temperature.

Outer channel dividers 461 and 462 may include angled portions 465 and 466, respectively, to better direct flow of hot air out of heat exchanger 400. Outer channel dividers 461 and 462 may each have an "L"-shaped cross-section similar to inner channel divider 430, to aid in attachment to the upper surface of surface portion 440 by tack welding, for example. Outer channel dividers 461 and 462 prevent leakage of hot gases from outer auxiliary channels 471 and 472 out of heat exchanger 400 into the external environment. Outer channel dividers 461 and 462 may be further sealed with an appropriate heat-tolerant caulking or sealing material, e.g., commercially available high temperature silicon rubber calking such as RTV® along a perimeter of outer channel dividers 461 and 462.

At the end of surface portion 440 opposite firebox 320, and as depicted in FIGS. 4 and 8, vertical portion 485 of heat exchanger 400 includes exhaust channel 810 which communicates with outer auxiliary channels 471 and 472. Vertical portion 485 of heat exchanger 400 extends along and is attached to vertical wall 242 at an end of reservoir 240 to direct hot exhaust gas along vertical wall 242 to exhaust opening or pipe 130 and out into the external environment. Exhaust channel 810 includes baffles 820 for laterally displacing the hot gasses across vertical portion 800 and vertical wall 242 of reservoir 240. Similar to baffles 420 in primary pass assembly 410, baffles 820 act to increase the dwell time of the hot gas laterally across the heat exchanger surface area abutting vertical wall 242.

Referring back to FIGS. 1 and 4, insulated outer liner 120 structurally supports and envelopes reservoir 240 and heat exchanger 400. Insulated outer liner 120 is attached by hinges to lid 110 (see FIG. 1), which closes reservoir 240 during heating, transportation, or storage. Outer liner 120 also supports conical flame tube 330 which extends into firebox 320 and is coupled to burner assembly 270. Support skids 151 and 152 are connected to outer liner 120 through resilient mounts 160 to provide support for the tray ration heating system 100 on the ground or in moving vehicles.

Figure 5:
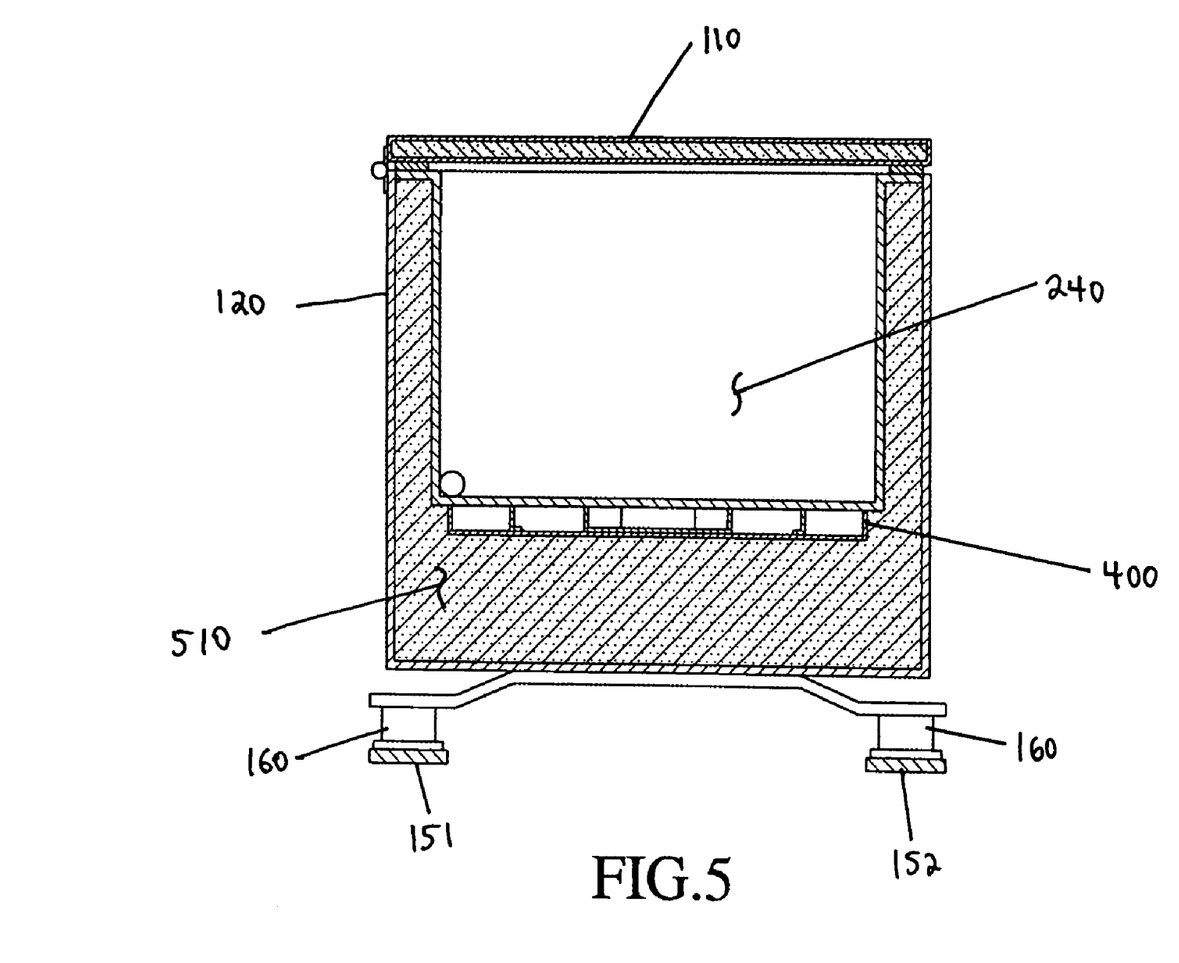
FIG. 5 provides a cross-sectional view of the heat exchanger in elevation looking from an end of the arrangement shown in FIG. 1.

Although not shown, the outer shell of firebox 320 is generally lined with hardboard insulation. As depicted in cross-section in FIG. 5, the void space between an assembly including reservoir 240 and heat exchanger 400 may be filled with additional insulating material 510 to reduce the exterior temperature of outer shell 120, which reduces the potential for an unsafe condition for operators of tray ration heating system 100.

Figure 6:
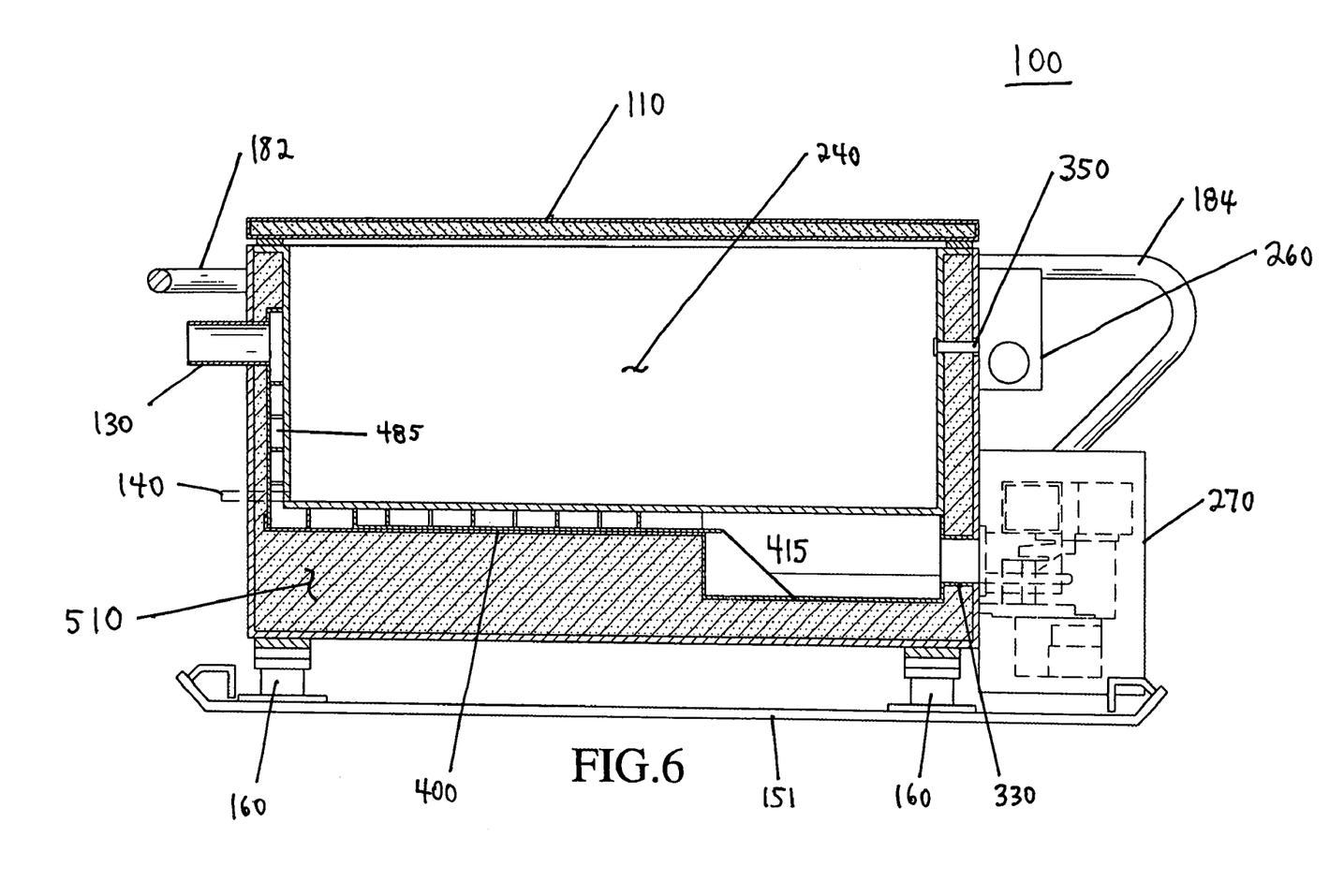
FIG. 6 provides a cross-sectional view in elevation looking from a side of the arrangement shown in FIG. 1.

FIG. 6 illustrates a cross-sectional view along the length of system 100, which gives another perspective of the arrangement and interrelationships between the various components described above.

In the foregoing embodiment, a method for transferring heat to a reservoir of liquid 240 through heat exchanger 400 includes introducing a heated products of combustion flow into firebox 320. The heated gas flows away from firebox 320 along a surface of reservoir 240. Turbulence in a tortuous passageway increases the dwell time of the hot gas along the surface of reservoir 240. The heated gas flow is reversed along the surface of reservoir 240 back toward firebox 320. The heated gas flow is again reversed along the surface of reservoir 240 away from firebox 320 to direct the heated gas flow away from firebox 320. The heated gas flow is directed along a vertical end or side surface 242 of reservoir 240. The heated gas flow is laterally displaced along vertical surface 242 of reservoir 240 by baffles 820. Finally, the heated gas flow is exhausted through exhaust pipe 130 from heat exchanger 400.

Further, although the disclosure above is directed to a tray ration heating system, system 100 may also be used, for example, to cook food directly, e.g., soup or stew, and may also be used to clean and sanitize dishes and other kitchen items.

EXPERIMENTAL RESULTS

Figure 9:
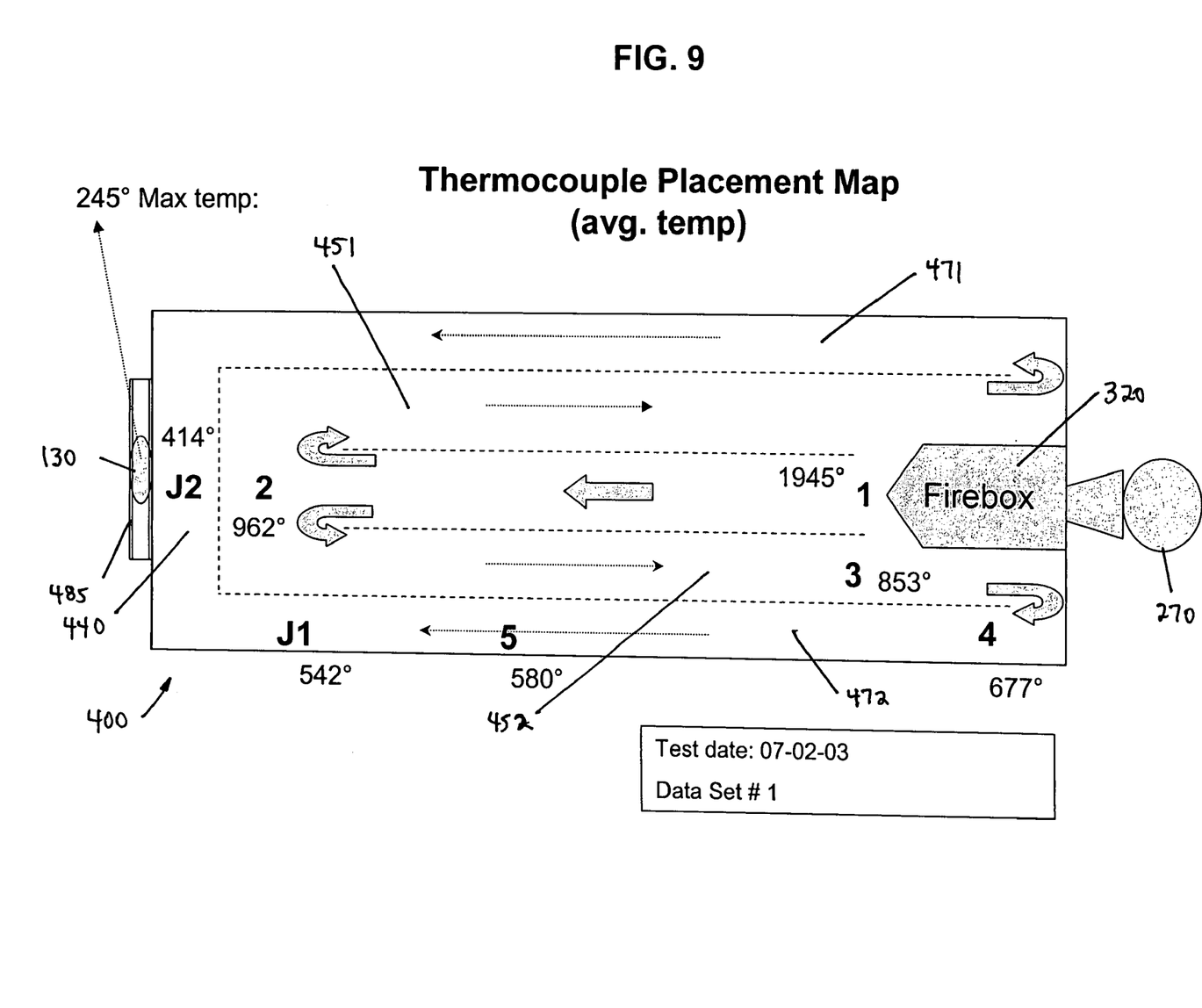
FIG. 9 illustrates thermocouple placement and representative temperatures internal to the heat exchanger.

The tray ration heating system 100 described above was instrumented with various temperature sensors in reservoir 240, and at different locations within heat exchanger 400 to determine its performance, as depicted in FIG. 9.

As indicated, the temperature of gas coming out of firebox 320 is initially about 2000° F. After the first pass along primary channel assembly 410, the temperature has lowered to 962 F. After the second pass along inner auxiliary channels 451 and 452, the temperature has been further reduced to 853 F. In the third pass along outer auxiliary channels 471 and 472, the temperature of the hot gas is reduced from 677 F. to 542 F., as shown. At the end portion of surface portion 440, the temperature is seen to be 414 F., and the final gas exhaust temperature out of exhaust port 130 is down to 245 F. This overall temperature differential and the various differentials shown indicates a high level of heat transfer from burner assembly 270 to reservoir 240.

The foregoing description of the invention illustrates and describes various embodiments of the invention. Additionally, the disclosure shows and describes only the preferred embodiments of the invention. However, it is to be understood that the invention is capable of use in various other combinations, modifications, and environments, and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed as new and desired to be protected by Letters Patent of the United States is:

1. A tray ration heating system, comprising:
   a reservoir open at a top thereof to receive rations and immerse said tray rations in hot water;
   a heat exchanger for supplying heat to said reservoir, said heat exchanger comprising a firebox at one end of said reservoir having an opening at one end to receive a burner flame tabe, and open along atop which faces an underside of said reservoir, said fire box having an opening at an opposite end to deliver heated gases from said burner along the underside of said reservoir to an opposite end of said reservoir,
   a main channel communicating with said opening extending the length of said reservoir underside, said main channel including a first plurality of baffles for introducing a tortuous path to hot gases moving through said main channel towards said opposite end of said reservoir;
   first and second auxiliary channels adjacent to said main channel for directing hot gases exiting said main channel along the underside of said reservoir towards said fire box;
   third and fourth auxiliary channels each adjacent to one of said first and second auxiliary channels for directing hot gases exiting said first and second auxiliary channels towards said opposite end of said reservoir;
   an exhaust channel communicating with said third and fourth auxiliary channels and extending along a vertical wall of said reservoir for directing said hot gases along said vertical wall to an exhaust opening, said exhaust channel having a second plurality of baffles for laterally displacing said hot gases;
   an insulated outer liner for supporting said reservoir and heat exchanger, said insulated outer liner having a lid which closes said reservoir tap during heating, said outer liner having an opening for receiving a burner flame tube which extends into said firebox; and
   a pair of supports connected to said liner.

2. A heat exchanger system suitable for use in transferring heat to a reservoir of liquid, the system comprising:
a burner having a flame tube;
a firebox having an opening at one end which receives the flame tube, and an opening at an opposite end through which gases produced by the burner flows;
a main channel in communication with the firebox opening and extending in a first direction from an end of the reservoir along a surface of the reservoir to an opposite end of the reservoir, said main channel guiding the heated gases along the first direction;
first baffle means arranged in the main channel for creating turbulent flow of the heated gases as the heated gases travel through the main channel in a tortuous path towards the opposite end of the reservoir in the first direction;
first and second auxiliary channels adjacent to the main channel and joined together at an open end portion of the main channel, the first and second auxiliary channels otherwise being separated by the main channel and arranged to direct the heated gases in a second direction along the surface of the reservoir opposite to the first direction, the first and second auxiliary channels directing the heated gases exiting the main channel from the opposite end of the reservoir back towards the firebox;
third and fourth auxiliary channels each adjacent to one of the first and second auxiliary channels and separated from each other by the main channel and the first and second channels, the third and fourth auxiliary channels being arranged to direct the heated gases exiting the first and second channels towards the opposite end of the reservoir along the surface of the reservoir in the first direction;
a vertical exhaust channel communicating with the third and fourth auxiliary channels and extending along a vertical wall of the reservoir, the vertical exhaust channel being arranged to direct the heated gases along the vertical wall to an exhaust opening;
second baffle means arranged in the vertical exhaust channel for laterally displacing the heated gases across an end portion width of the reservoir before the heated gases reach the exhaust opening; and
an insulated outer cover containing the reservoir and heat exchanger, said insulated outer liner having a lid which closes to cover the reservoir top during heating, the insulated outer cover supporting the burner and insulating the burner from an external environment.

3. A method for transferring heat to a reservoir of liquid through a heat exchanger, the method comprising;
introducing a flow of heated gases into a firebox;
flowing the heated gases from the firebox Through a main channel along a surface of the reservoir in a first direction;
creating turbulence in the heated gas flow in said main channel;
reversing the heated gas flow from said main channel along the surface of the reservoir in a second direction through first and second auxiliary channels, wherein said first and second auxiliary channels are located adjacent to said main channel;
reversing the heated gas flow from said first and second auxiliary channels along the surface of the reservoir through third and fourth auxiliary channels, wherein each of said third and fourth auxiliary channels is adjacent to one of said first and second auxiliary channels;
directing the heated gas flow from said third and fourth auxiliary channels along a vertical surface of the reservoir;
laterally displacing the heated gas flow along the vertical surface of the reservoir; and
exhausting the heated gas flow from the heat exchanger.

4. A liquid heating system comprising:
a reservoir for supporting items to be heated in a bat of water;
a firebox having an open top facing the bottom of said reservoir;
a heat exchanger extending from said firebox along the bottom of said reservoir and along one vertical side thereof, said heat exchanger forming a plurality of channels, said plurality of channels comprising:
a main channel communicating with said firebox at one end of said reservoir and extending the length of said bottom of said reservoir towards an opposite end of said reservoir, said main channel including a first plurality of baffles for introducing a tortuous pat to heat moving through said main channel towards said opposite end of said reservoir;
first and second auxiliary channels adjacent to said main channel for directing heat exiting said main channel along the bottom of said reservoir towards said firebox;
third and fourth auxiliary channels each adjacent to one of said first and second auxiliary channels for directing heat exiting said first and second channels towards said opposite end of said reservoir; and
an exhaust channel communicating with said third and fourth auxiliary channels and extending along said one vertical side of said reservoir for directing said heat along said one vertical side to an exhaust opening; and
an outer liner enclosing said reservoir, heat exchanger and firebox, said outer liner having a first opening coincident with said exhaust opening for discharging beat from said exhaust channel.

5. The improved liquid heating system of claim 4, wherein said passageway along said vertical side exhause channel includes a series of baffles for laterally displacing heat which travels vertically in said passageway exhaust channel.

6. The improved liquid heating system according to claim 4, further comprising first and second skids for supporting said liner.

7. The improved liquid heating system according to claim 4, wherein a layer of insulation is placed between said liner and said reservoir.

8. The liquid heating system of claim 4, wherein said outer liner supports a lid for closing a top of said reservoir during heating of said items.

9. The liquid heating system of claim 4, comprising a burner and controller for supplying heat to said firebox through a second opening in said liner and, thereafter, to said plurality of channels, heating the bottom and vertical side of said reservoir to a temperature for heating said items.

* * * * *